United States Patent [19]

Kuhn et al.

[11] 4,148,024
[45] Apr. 3, 1979

[54] CAPACITIVELY COUPLED INDICATOR FOR A SUBMERSIBLE FUSE

[75] Inventors: Edmund W. Kuhn, Mt. Lebanon; Allan I. Bennett, Murrysville, both of Pa.

[73] Assignee: Westinghouse Electric Corp., Pittsburgh, Pa.

[21] Appl. No.: 773,459

[22] Filed: Mar. 2, 1977

[51] Int. Cl.² .................. G08B 21/00; H01H 85/30
[52] U.S. Cl. .................. 340/638; 337/206; 337/241
[58] Field of Search ............ 340/250, 252 R, 253 A, 340/638, 654, 662; 174/11 BH; 324/133; 337/206, 222, 223, 224, 266, 280, 243

[56] References Cited

U.S. PATENT DOCUMENTS 2,036,223  4/1936  Läpple ........................ 340/250

Primary Examiner—John W. Caldwell, Sr.
Assistant Examiner—Daniel Myer
Attorney, Agent, or Firm—M. J. Moran

[57] ABSTRACT

An electric fuse is disposed within a fluid tight submersible enclosure. The status of the fuse is indicated by an externally mounted neon lamp. The outside surface of the enclosure is coated with conductive paint for safety. Likewise, most of the inside surface of the enclosure is coated with conductive paint to reduce corona therein. A relatively thin annular band of semiconductive paint is disposed between terminals of the fuse apparatus on the inner surface of the enclosure. The enclosure is made primarily of insulating material. When the fuse blows, the voltage difference between the opposite ends of the fuse is capacitively coupled through the enclosure to the indicator. The indicator is sensitive to a change in voltage thereacross and periodically illuminates to indicate that the fuse within has blown.

10 Claims, 11 Drawing Figures

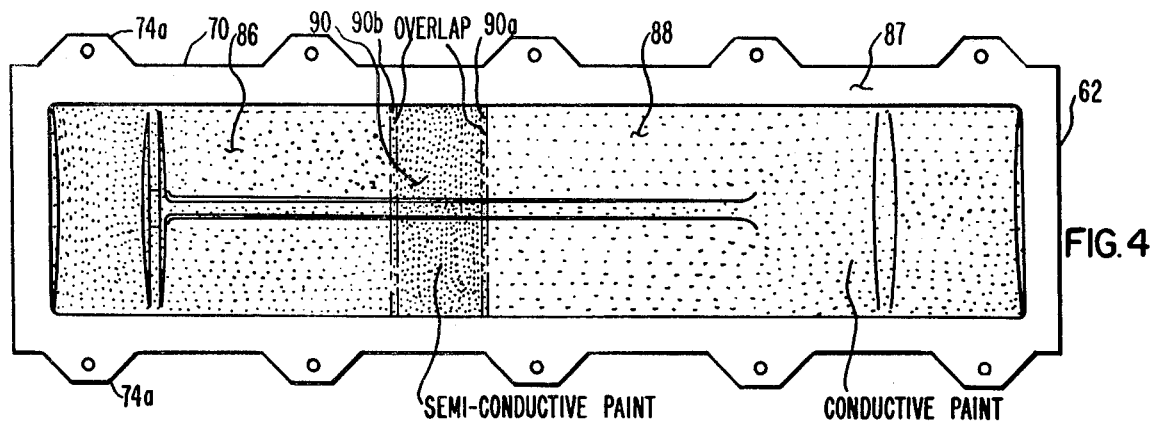
FIG. 4
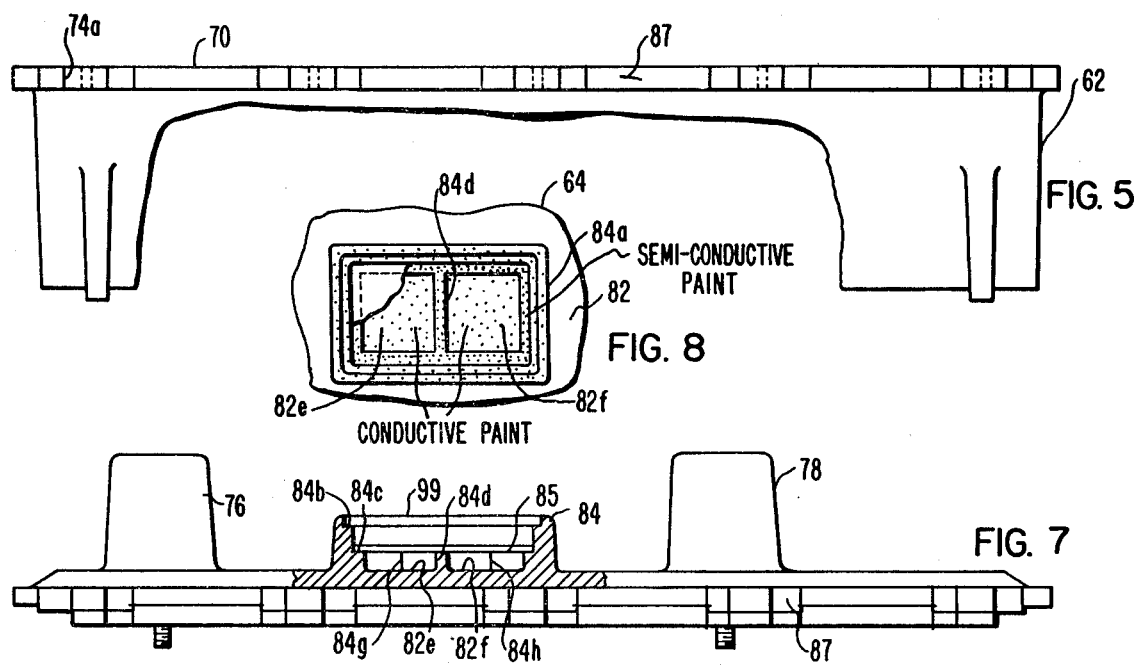
FIG. 5
FIG. 8
FIG. 7
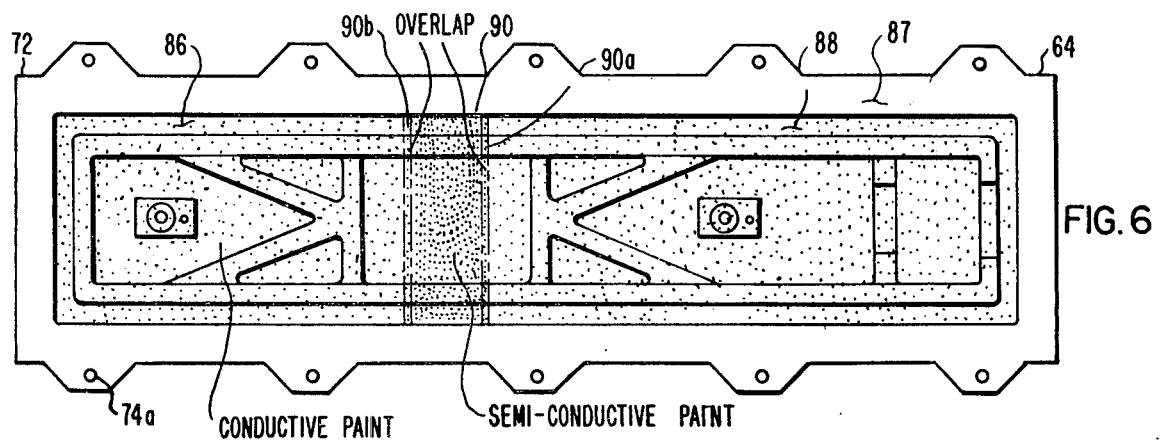
FIG. 6

CAPACITIVELY COUPLED INDICATOR FOR A SUBMERSIBLE FUSE

CROSS-REFERENCE TO RELATED APPLICATIONS

The subject matter of this invention is related to Patent application Ser. No. 613,836, entitled "Non-venting Condenser For An Expulsion Fuse" filed Sept. 16, 1975 by F. L. Cameron. The subject matter of this invention is also related to co-pending concurrently filed application Ser. No. 773,460. Both of the above-mentioned patent applications are assigned to the assignee of the present invention.

BACKGROUND OF THE INVENTION

1. Field of the Invention

The subject matter of this invention relates generally to indicating means for submersible fuses and relates more specifically to capacitively coupled indicating means for submersible fuses.

2. Description of the Prior Art

It is known to use indicating means in conjunction with fuses. A directly connected indicator is taught in U.S. Pat. No. 2,735,088 by D. J. Kinzer, issued Feb. 14, 1956. It is also known to use capacitively coupled indicators for external circuit wires such as is taught in U.S. Pat. No. 2,036,223, issued Apr. 7, 1936 to H. Lapple. It is also known to use neon lamps and condensers for certain purposes in conjunction with fuses and fuse holders. Such uses are taught in U.S. Pat. No. 3,229,065 issued Jan. 11, 1966 to E. Borys, and U.S. Pat. No. 2,545,760 issued Mar. 20, 1951 to P. B. Blanchard. It is also known to use translucent fuse barrels through which can be seen an electroluminescent effect which occurs under certain electrical conditions. Such a use is taught in U.S. Pat. No. 3,513,427 issued May 19, 1970 to K. W. Prosser et al. It would be advantageous if a submersible fuse of the type found in underground transmission systems could be provided with an indicating means for indicating the status of the fuse, that is whether it is blown or conducting. Furthermore, it would be further advantageous if the mode of coupling the indicator to the fuse was indirect (i.e. capacitive) so that the natural capacitive effect of the main body of the insulating enclosure could be utilized.

SUMMARY OF THE INVENTION

In accordance with the invention a submersible fuse assembly is taught which includes a fuse disposed within a waterproof submersible enclosure. The outside surface of the waterproof enclosure is coated or covered almost totally with conductive paint for safety (i.e. grounding). The inside surface thereof is covered with conductive paint except in one region between the terminals of the fuse where semiconductive paint is utilized. The conductive paint reduces corona. The semiconductive paint performs many functions, one of which is to electrically isolate the spaced main terminals of the fuse so as not to short-circuit or bypass the fuse through the conductive paint. Another purpose for the semiconductive paint is to provide a resistive gradient between conductive paint surfaces on the internal portion of the enclosure to assist in reducing corona. In accordance with the invention, the electrically isolated conducting portions on the inside surface of the insulator are capacitively coupled to the outside surface of the enclosure where appropriate isolation techniques are utilized to electrically actuate a neon light indicator under certain conditions. The connection is capacitive; consequently, the integrity of the enclosure is not reduced by placing holes therein for electrical conductors for the indicator. It does not matter upon which fuse terminal the load for the fuse is connected and upon which terminal the source is connected.

BRIEF DESCRIPTION OF THE DRAWINGS

For a better understanding of the invention, reference may be had to the preferred embodiments shown in the accompanying drawings, in which:

FIG. 4 shows a plan view of the bottom portion of the enclosure of FIG. 1;

FIG. 5 shows a side elevation of the enclosure portion shown in FIG. 4;

FIG. 6 shows a plan view of the top portion of the enclosure of FIG. 1;

FIG. 7 shows a side elevation of the enclosure portion shown in FIG. 6;

FIG. 8 shows a view of a portion of the outer surface of the top cover shown in FIGS. 6 and 7;

DESCRIPTION OF THE PREFERRED EMBODIMENTS

Figure 1:
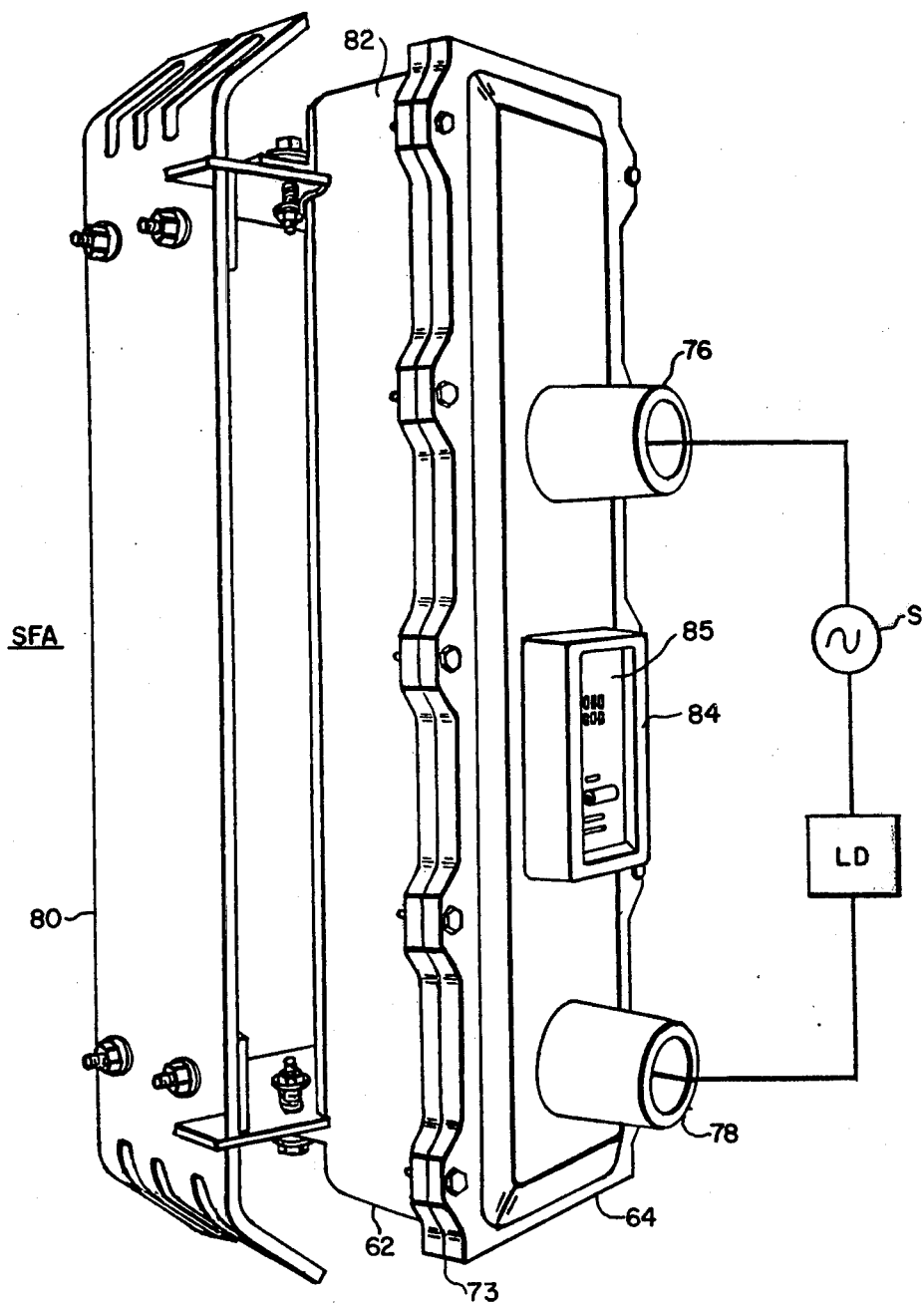
FIG. 1 shows an isometric view of a submersible fuse enclosure.

Referring now to the drawings and FIG. 1 in particular, a submersible fuse assembly SFA is shown. The fuse assembly SFA comprises an enclosure constructed by joining a bottom fuse assembly enclosure portion 62 with a top fuse assembly enclosure portion 64 and sealing the surfaces of the jointure with an appropriate gasket 73. The assembled fuse enclosure SFA is disposed upon a mounting apparatus 80. There are shown two terminal assemblies 76 and 78 to which are serially connected a schematically shown source of alternating current S and load LD. Shown disposed on one portion of the cover 64 is an indicator assembly 84 in which is disposed a printed circuit card 85, the use of which will be described hereinafter. The entire enclosure assembly SFA, except for two small regions, described later as 84c and 84d, is coated with an electrically conductive layer of paint 82 so that the entire outer surface of the assembly may be maintained at electrical ground potential for safety and to minimize undesirable corona effects.

Figure 2:
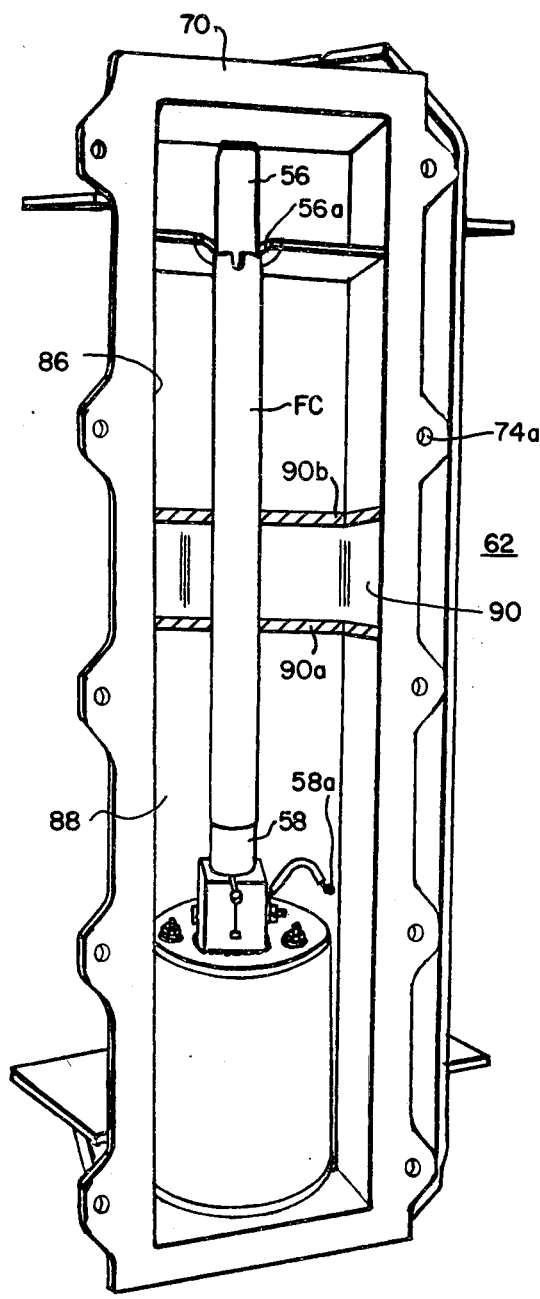
FIG. 2 shows an isometric view of the bottom portion of the enclosure of FIG. 1.

Referring now to FIG. 2, the lower portion 62 of the fuse enclosure assembly SFA is shown. The lower portion 62 has a fuse FC disposed therein. The fuse FC has two ferrules 56 and 58. The inner surface of the enclosure portion 62 is painted with a thin layer of conductive paint at regions 86 and 88. The main body of the enclosure portion 62 comprises electrically insulating material. The conductive paint regions 86 and 88 are disposed on the inner surface of that dielectric material. Disposed on the inner surface between the two sections of conductive paint 86 and 88 is a thin annular layer of semiconductive paint 90 which overlaps the conductive paint of regions 86 and 88 in marginally small regions 90b and 90a. Effectively, the semiconductive paint 90 electrically isolates the conductive inner surface 86 from the conductive inner surface 88. It will be noted that ferrule 56 is generally in the vicinity of the conductive electrical surface 86 and is electrically connected thereto at 56a and that ferrule 58 is in the vicinity of the conductive surface 88 and is electrically connected thereto at 58a. A flat joining surface 70 is shown as well as openings 74a through which bolts or the like may protrude for fastening purposes. The conductive paint is present in the openings 74a.

Figure 3:
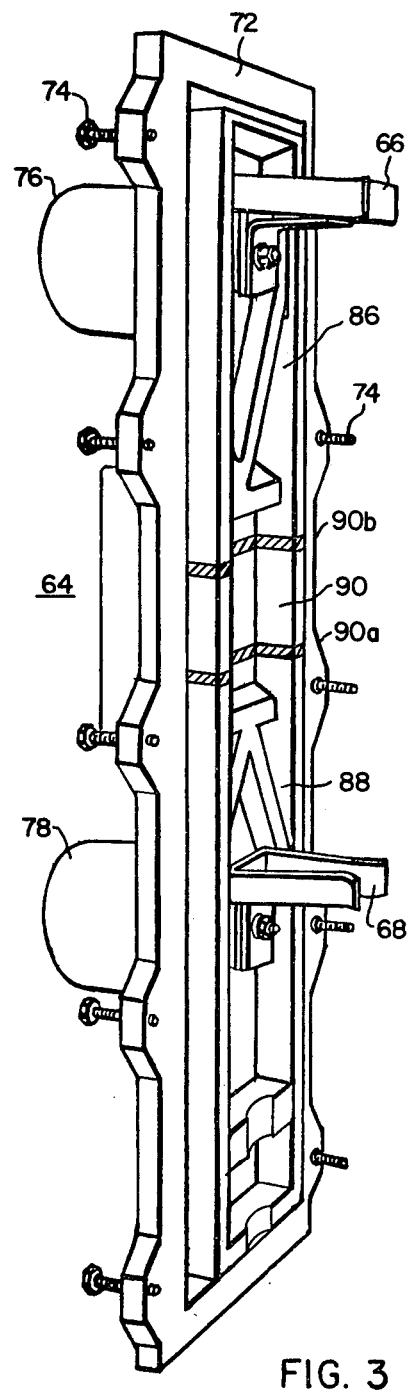
FIG. 3 shows an isometric view of the top portion of the enclosure of FIG. 1.

Referring now to FIG. 3, the top or complementary portion or cover 64 of the enclosure SFA shown in FIG. 1 is shown. It will be noted that enclosure portion 64 has two electrically conductive ferrule conductors 66 and 68 which are to be electrically interconnected with ferrules 56 and 58 when the enclosure SFA is assembled. The terminals 66 and 68 are connected in electrical circuit relationship with the terminal assemblies 76 and 78, respectively. The inner portion of the top cover 64 has disposed thereon thin layers of electrically conductive paint in the regions 86 and 88 separated by the marginally overlapping semiconductive paint 90. This is in correspondence with the similarly identified regions shown in FIG. 2. Consequently, when the top cover 64 is joined with the bottom portion 62 to form the completed apparatus shown in FIG. 1, the region 86 comprises a continuous internal conducting portion and the region 88 comprises a separate continuous internal conducting portion, both of which are separated by the continuous annular ring 90. When assembled, a flat joining surface 72 shown in FIG. 3 is disposed to align with the surface 70 shown in FIG. 2. In a preferred embodiment of the invention, a gasket 73 (shown partially in FIG. 10) is disposed between the latter two surfaces and is compressed therebetween by the action of turning the fasteners 74 on appropriate latch means disposed on the other side of the hole 74a shown in FIG. 2. It will be noted that the internal periphery of the surface 70 of FIG. 2 and the internal peripheral of the surface 72 shown in FIG. 3 comprise relatively sharp edges which if not properly electrostatically shielded, become regions of relatively high electrical field intensity at which corona may cause flashover which in turn may cause dielectric deterioration in the top cover 64 or the bottom portion 62 or both. A suitable shielding arrangement is taught hereinafter with respect to FIG. 10.

Referring now to FIGS. 4 through 8, plan and elevation views of the bottom portion 62 and top cover 64 are shown as well as a broken-away portion of the capacitive coupling region for the indicator 84. Particular reference to FIGS. 4 through 6 show dielectric material 87 comprises the basis of the enclosure portions 62 and 64. It can be therefore seen that either or both of the enclosure portions 62 and 64 may comprise capacitors, that is, two spaced conductive plates separated by a region of dielectric material. In this case, the dielectric material is obviously 87 and the spaced conductive plates comprise in one instance internal conductive surface 86 and a portion of the external conductive surface 82 and in the other instance, internal conductive surface 88 and another portion of the external conductive surface 82. For purposes of clarity, it is to be understood that the actual capacitive plates associated with the outer surface 82 of the various capacitive means are small conductive regions 82e and 82f which will be described more fully hereinafter with respect to FIGS. 7 and 8.

Referring now more specifically to FIGS. 7 and 8, it can be seen that the indicator 84 of FIG. 1, comprises a raised portion 84a which completely surrounds two isolated electrically conductve regions 82e and 82f. The raised portion 84a has two ridges 84b and 84c therein, onto which a transparent covering 99 and a printed circuit board 85 are respectively placed or disposed. Elements on the printed circuit board 85 are serially connected to the conductive regions 82e and 82f by way of conductors 84g and 84h respectively. The indicator portion 84 includes a raised central portion 84d the top surface of which is aligned with the previously described ridge 84c. Consequently, the conductive portion 82e and 82f are well isolated from one another by the vertical walls of the central ridge portion 84d. It is to be understood that the entire conductor assembly 84 is coated with conductive paint except for the ridge 84c and the ridge 84d which are covered with semiconductive paint which may be similar to the paint 90 shown in FIGS. 4 and 6. Furthermore, the surfaces or capacitor plates 82e and 82f are electrically conducting. Finally, it is to be understood that the member 99 may comprise plastic, glass or other electrically insulating material which is relatively transparent. In the preferred embodiment of the invention, an electrical neon light is disposed immediately above the printed circuit board 85 but beneath the transparent pane 99. This is to prevent personnel from making electrical contact with the surfaces 82e and/or 82f. As will be discussed later, the relative voltages impressed across the various portions of the latter mentioned members and surfaces of conductor 84, are not appreciably large when compared with the potential voltages within the enclosure. Nevertheless, personnel protection is provided. By referring to FIGS. 6 and 7, it can be seen that conductive surface 82e is aligned at least partially with conductive surface 86 on the inner portion of the enclosure. Likewise, conductive surface 82f is aligned with conductive surface 88 on the inner portion of the enclosure 64. Consequently, capacitive coupling is possible through the main body of the dielectric material 87 between the plate 82e and the conductive surface 86 in one instance, and between the plate 82f and the conductive surface 88 in the other instance. The remaining portions of the indicator 84 are serially connected between the latter two mentioned capacitor regions by way of the conductors 84g and 84h.

Figure 9:
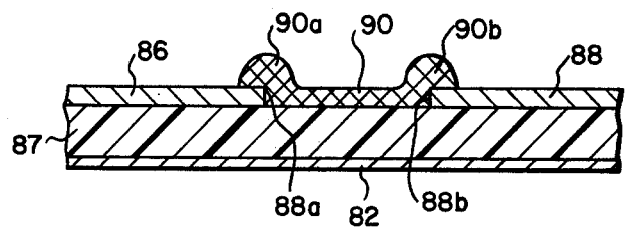
FIG. 9 shows a broken away portion, in section of a portion of the enclosure of FIG. 1 in the region where semiconductive paint is disposed in overlapping relationship with conductive paint.

Referring now to FIG. 9, a broken-away section of the enclosure in the region of the annular semiconductive ring 90 is shown. It is to be understood that this section is shown in exaggerated configuration. The outer layer of relative thin conductive paint 82 is shown as well as the two spaced layers of electrically conductive paint 86 and 88. Sandwiched between the conductive layer 82 and the conductive layers 86 and 88 is the dielectric material 87 of the main body of the fuse enclosure. It will be noted that the relatively sharp corners 88a and 88b of the terminated conductive surfaces 86 and 88 are potential areas of high electric field strength at which corona discharge may occur. However, these corners are shielded by beads or mounds of semiconductive material 90a and 90b respectively. It is also to be noted that the semiconductive paint 90 overlaps the conductive paint 86 and 88. In a preferred embodiment of the invention, the semiconductive paint is approximately two inches wide and completely encircles the inside of the completely assembled enclosure SFA. The device as thus constructed supports the integrity of the fuse in case of a fault. Full line potential or voltage to ground from either terminal assembly 76 or 78 fuse interruption will appear across this two inch width. The ultimate purpose of the combination of the conductive surface 86 and 88 utilized in conjunction with the overlapping and mounded semiconductive surface 90 is primarily to reduce corona discharge within the enclosure. Utilization of the capacitive effect between the internal conductive surfaces 86, 88 and the external conductive surface 82 assists in providing the indicating function.

Figure 10:
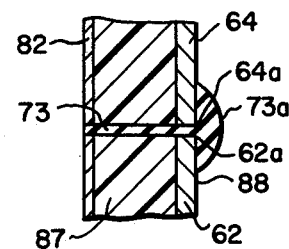
FIG. 10 shows a sectional view, partially broken away, of the enclosure of FIG. 1, at the place where the top portion is joined to the bottom portion.

Referring now to FIG. 10, a cross-section of a broken-away portion of the top cover 64 and the bottom portion 62 in the region of a gasket 73 is shown. The outer conductive surface 82 and the inner conductive surface 88 (in this case) are shown on opposite sides of the dielectric material 87 of the main body of the enclosure SFA. The capacitive qualities of the arrangement as thus constructed are easily visualized in this Figure. It will be noted that the relatively sharp corners or edges 64a and 62a of the mating or complementary portions 64 and 62 respectively are regions of high electric field strength at which flashover or corona is relatively more likely to occur. It is desirable to shield these corners with an arcuate surface such as may be formed by an extension of the gasket 73 into the internal portion of the enclosure to form the bead 73a. Bead or shied 73a thus reduces the effect of the high electric field at the corners 64a and 62a. This reduces the relative likelihood for corona formation or flashover inside of the enclosure. In this case, the presence of the gasket 73 also excludes the presence of air between the edges of the conductive or semiconductive paint at the juncture of the top and bottom sections 64 and 62. This condition provides shielding which reduces corona around the edges 62a and 64a along the entire periphery of the assembled enclosure. Placement of the gasket in the manner shown may be obtained by extruding excess gasket material to the inside when clamping the top section to the bottom section or by forming the gasket initially with a bead. The gasket material may be applied as a flowable liquid, consequently after assembly of the top portion against the bottom portion the assembly may be oriented in such a manner as to allow the bead 73a to be formed. This completely covers the junction of both the top and bottom sections.

Figure 11:
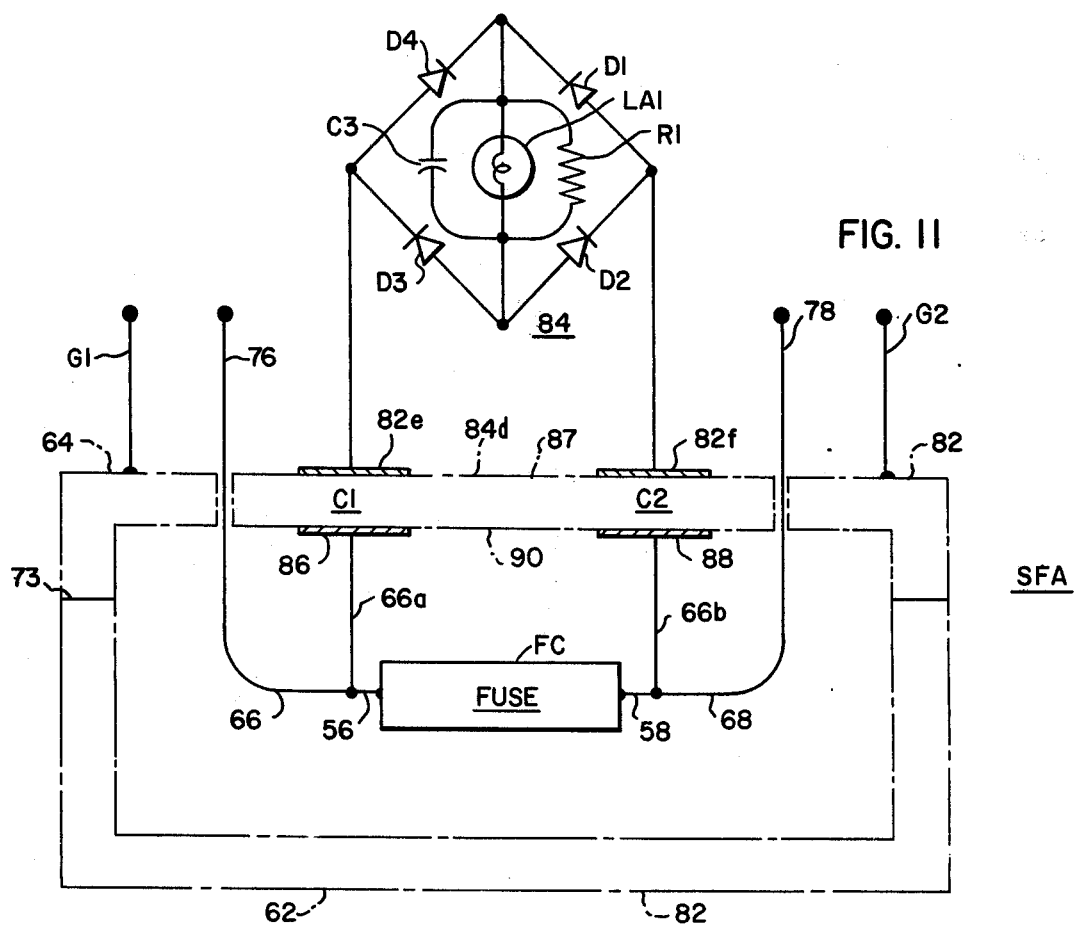
FIG. 11 shows a schematic circuit diagram of the indicator and fuse apparatus of the enclosure of FIG. 1.

Referring now to FIG. 11, a schematic diagram of a submersible fuse with indicating means is shown. The gasket 73 is shown schematically separating the top portion or cover 64 from the bottom portion 62. A fuse FC is disposed within the central part of the enclosure. The ferrules of the fuse are represented schematically at 56 and 58. The spring loaded connectors are indicated schematically at 66 and 68 and the external terminal assemblies are shown schematically at 76 and 78, respectively. Although not shown in other embodiments of the invention, electrically conductive leads 66a and 66b may be attached to ferrules 56 and 58 to connect the ferrules to the internal wall portions of the completed fuse assembly SFA. One capacitor plate for the ferrule 56 is shown schematically at 86 and one capacitor plate for the ferrule 58 is shown schematically at 88. The complementarily spaced capacitor conductors 82e and 82f for plates 86 and 88, respectively are shown on the outside of the dielectric material 87, thus forming the two capacitors C1 and C2, respectively. A diode bridge arrangement comprising the diodes D1 through D4 is interconnected to the plates 82e and 82f in such a manner as to interconnect the parallel combination of the capacitive element C3, the lamp LA1 and the resistive element R1 in series circuit relationship with the capacitive elements C1 and C2. During normal operating conditions, when the fuse FC is not blown, currents flowing in capacitive elements C1 and C2 are relatively equal and consequently the voltage across the input terminals of the bridge D1–D4 is zero, thus substantially preventing energization of the lamp LA1. In fact, slight variations in capacitance and other physical quantities of the apparatus may cause the voltage to be slightly larger than zero, however, the lamp LA1 has a minimum value of voltage at which it will illuminate and this value is not easily unintentionally attained because capacitive element C3 cannot be easily charged to a voltage sufficient to illuminate the lamp LA1 if the currents in capacitive elements C1 and C2 are generally equal and opposite. In the latter case, the resistive element R1 acts as a leakage resistor which shunts current from the capacitive element C3 to prevent it from being charged significantly. However, should the fuse FC blow, then either the terminal assemby 76 or the terminal assembly 78 will become significantly higher in voltage potential than the other. The reason for this is that one of the terminals of the terminal assembly 76 or 78 is connected to a high voltage source (not shown) while the other of the terminals 78 or 76 respectively is connected to a load (not shown). It is not important which of the terminals 76 or 78 is connected to the load and which is connected to the source nor need it be known when installing the fuse. The diode arrangement D1 through D4 is such that the indicator device will work regardless of which side of the fuse is connected to the load and which side is connected to the source. It will be noted that two ground connections G1 and G2 are shown, although this is not limiting. These provide a means for connecting the outer conductive surface 82 to ground to establish ground potential thereupon. It will also be noted that the semiconductive region 90 exists between the capacitive plates 86 and 88 on the internal portion of the enclosure whereas the semiconductive region 84d exists between the plates 82e and 82f on the external portion of the enclosure. Presuming for purposes of illustration that the terminal 76 of the terminal assembly is connected to the high voltage source and that the terminal of the terminal assembly 78 is connected to a load, when the fuse FC blows, plate 86 will be at a significantly higher potential than plate 88. The semiconductive surface 90 will act to gradually grade the voltage between plate 86 and 88 to prevent flashover or excessive current leakage therebetween. The semiconductive paint 90 has the characteristic of maintaining the voltage integrity of the blown fuse between the ferrules 56 and 58 without setting up high field voltage discontinuities which could cause flashover. In the latter case, the capacitive element C1 will have established thereacross most of the voltage which is present between ground and the ferrule 56. Some embodiments of the invention have a maximum voltage available between ferrule and ground of between 15 kilovolts and 60 kilovolts. In this case, all but approximately 150 to 200 volts of this is dropped across the capacitive element C1. The remaining voltage is dropped across the parallel combination of the capacitive element C3, the lamp LA1, and the resistive element R1. The other capacitive element C2 returns the current in the series connected indicator 84 to ground either through leakage to the outer surface 82 or through the load connected to the terminal 78. When the potential difference between the input terminals of the bridge is sufficiently high, capacitive element C3 is quickly charged to a voltage sufficient to break down the lamp LA1 which may be a neon lamp or the like. This then causes the neon lamp to provide a discharge path for the charge which has been accumulated in the capacitive element C3. The discharge is relatively rapid and of course intermittent. The relatively rapid discharge and the intensity of the pulse of the discharge cause a relatively intense pulse of illumination of the lamp LA1. Were the lamp to conduct continuously rather than intermittednly, the average value of current flowing therethrough would be such that the intensity of illumination would be less even though the lamp were on for a longer period of time. Consequently, when the fuse FC is blown, the lamp LA1 operating in conjunction with the capacitive element C3 will flash brilliantly and intermittently at a frequency determined by the value of the capacitive element C3 among other things. In this case, the diode D4 and the diode D2 act to conduct electrical current but the diodes D1 and D3 do not pass substantial electrical current.

It is to be understood with respect to the embodiments of the invention that not all of the inventive concepts taught herein need be used simultaneously for the other inventive concepts to be effective. It is also to be understood that the schematic diagram shown in FIG. 11 should not be considered as limiting. It is merely a representation of the interrelationship of important inventive elements. The conductive plates 86 and 88 of the capacitive elements C1 and C2 may occupy substantially greater portions of the internal part of the enclosure than is depicted in FIG. 11. It is also to be understood that the arrangement of the indicating means 84 as shown in FIG. 1, on the side or top of the completely assembled enclosure SFA is not necessarily limiting and long leads may be utilized between the enclosure and the indicator 84 to provide more convenient indications in some embodiments. It is also to be understood that the device to be enclosed by the enclosure SFA need not be limited to a fuse but may in some instances be a circuit breaker or a circuit interrupter of some other kind. It is also to be understood that FIGS. 9 and 10 are shown in generally exaggerated dimension for purposes of simplicity of illustration.

The apparatus taught herein has many advantages. One advantage lies in the fact that conductive surfaces on the internal and external portions of a submersible closure may be utilized to provide capacitive coupling between a relatively high voltage device which is disposed within the enclosure and a status indicator which is disposed outside of the enclosure. The utilization of capacitive coupling eliminates the necessity for placing holes or other openings in the enclosure through which water or other materials may seep thus causing damage to the element which is to be protected by the enclosure. Another advantage lies in the fact that a bridge circuit arrangement allows for the utilization of a fuse assembly without the need for determining the location of the source and the location of the load. The bridge allows the indicating lamp to work bilaterally. Another advantage lies in the fact that the flashing lamp provides a more readily observable indication of the status of the element within the enclosure than a continuously glowing or illuminated lamp. Another advantage lies in the fact that the energy for supplying the indication comes from the source that is being protected by the fuse by way of capacitive coupling. Another advantage lies in the fact that the utilization of a capacitive element to store charge not only provides the flashing function previously described but discharge thereof through the lamp LA1 rapidly and with a relatively high amount of current provides an intense illumination pulse for the lamp LA1 thus allowing the lamp to be seen at a great distance such as from the surface of a street through a manhole opening.

What we claim as our invention is:

1. A fuse, comprising:
   a. enclosure means having a pair of spaced terminals thereon which extend from the inside portion of said enclosure means to the outside portion thereof, said enclosure means comprising dielectric material;
   b. fuse means disposed within said enclosure means, said fuse means being protected by said enclosure means, said fuse means being serially connected to said pair of terminals; and
   c. indicator means disposed outside of said enclosure means for indicating when said fuse means has blown; said indicator means being capacitively connected with said fuse means through said dielectric material of said enclosure means for so indicating.

2. A fuse, comprising:
   a. enclosure means having a pair of spaced terminals thereon which extend from the inside portion of said enclosure means to the outside portion thereof, said enclosure means comprising dielectric material;
   b. fuse means disposed within said enclosure means, said fuse means being protected by said enclosure means, said fuse means having electrically conducting ferrules which are serially connected to said pair of terminals; and
   c. electrical indicator means disposed outside of said enclosure means for indicating when said fuse means has blown; said indicator means being capacitively connected with said ferrules of said fuse means through said dielectric material of said enclosure means for so indicating.

3. A fuse, comprising:
   a. enclosure means having a pair of spaced terminals thereon which extend from the inside portion of said enclosure means to the outside portion thereof, said enclosure means comprising dielectric material having internal and external conductive surface portions;
   b. fuse means disposed within said enclosure means, said fuse means being protected by said enclosure means, said fuse means having electrically conducting ferrules which are serially connected to said pair of terminals, one of said ferrules also being electrically connected to said internal surface portion; and
   c. electrical indicator means disposed outside of said enclosure means for indicating when said fuse means has blown; one electrical portion of said indicator means being connected to said external surface portion for thus being capacitively coupled with said ferrule through said dielectric material of said enclosure means, another electrical portion of said indicator means being interconnected with a reference voltage potential, a predetermined difference in voltage between the voltage at said ferrule and said reference voltage potential existing when said fuse means is blown, said latter difference being thus impressed across said indicator means for indicating that said fuse means is in a blown state.

4. A submersible fuse, comprising:
a. enclosure means having first and second spaced terminal means thereon which extend from the inside portion of said enclosure means to the outside portion thereof, said enclosure means comprising a main body of dielectric material with relatively thin conductive surfaces on the inside and outside portions thereof, a first portion of said inside conductive surface being spaced from a second portion thereof to electrically isolate said latter two portions from each other; a first portion of said outside conductive surface being spaced from a second portion thereof to electrically isolate said latter two portions from each other, said first inside conductive portion and said first outside conductive portion being therefore capacitively coupled through said dielectric material, likewise said second inside conductive portion and said second outside conductive portion being capacitively coupled through said dielectric material;
b. fuse means disposed within said enclosure means for protection, said fuse means having first and second spaced conductive ferrule means thereon, said first ferrule means being connected to said first terminal means and said first inside conductive portion, said second ferrule means being connected to said second terminal means and said second inside conductive portion; and
c. electrical indicator means disposed outside of said enclosure means for indicating when said fuse means has blown, said indicator means being serially connected between said first outside conductive portion and said second outside conductive portion, said indicator means being thus serially capacitively connected to at least one of said ferrule means for thus having a voltage impressed thereacross, said voltage existing between said one ferrule means and an electrical reference point when said fuse is blown, said voltage actuating said indicator means to give an indication that said fuse is blown.

5. The combination as claimed in claim 4 wherein said reference point is said other ferrule means, said voltage which is impressed across said indicating means being generally equal to a portion of the voltage which exists between said first and second ferrule means when said fuse is blown.

6. The combination as claimed in claim 5 wherein a large portion of said voltage between said first and second ferrule means is impressed across said dielectric material of said enclosure means relative to the amount of voltage which is impressed across said indicator means.

7. The combination as claimed in claim 6 wherein said indicator means comprises a lamp.

8. The combination as claimed in claim 7 wherein said lamp flashes to indicate.

9. The combination as claimed in claim 8 wherein said indicator means comprises a diode bridge circuit as an input to allow current to flow into said lamp from either direction for indication.

10. The combination as claimed in claim 7 wherein said lamp is electrically connected to a storage capacitive means for storing charge and periodically discharging said charge as a pulse of current through said lamp to provide a flashing indication of relatively large light intensity relative to the light intensity which would otherwise be present at any instant when said lamp glows continuously.

* * * * *